(12) United States Patent
Hestetun (10) Patent No.: US 9,103,473 B2
(45) Date of Patent: Aug. 11, 2015

(54) CONNECTION APPLIANCE AND CONNECTION ARRANGEMENT COMPRISING SUCH A CONNECTION APPLIANCE

(71) Applicant: VETCO GRAY SCANDINAVIA AS, Sandvika (NO)

(72) Inventor: Steinar Hestetun, Billingstad (NO)

(73) Assignee: Vetco Gray Scandinavia AS, Sandvika (NO)

( * ) Notice: Subject to any disclaimer, the term of this patent is extended or adjusted under 35 U.S.C. 154(b) by 0 days.

(21) Appl. No.: 14/054,419

(22) Filed: Oct. 15, 2013

(65) Prior Publication Data
US 2014/0103636 A1 Apr. 17, 2014

(30) Foreign Application Priority Data

Oct. 17, 2012 (EP) .................................... 12007173

(51) Int. Cl.
| | |
|---|---|
| E21B 43/013 | (2006.01) |
| F16L 1/26 | (2006.01) |
| F16L 37/00 | (2006.01) |
| F16L 37/62 | (2006.01) |

(52) U.S. Cl.
CPC ................ *F16L 1/26* (2013.01); *E21B 43/013* (2013.01); *F16L 37/002* (2013.01); *F16L 37/62* (2013.01)

(58) Field of Classification Search
CPC ....... E21B 43/013; E21B 43/0107; F16L 1/26
USPC ........... 166/347, 341–343, 360, 368; 405/169
See application file for complete search history.

(56) References Cited

U.S. PATENT DOCUMENTS

| | | | | |
|---|---|---|---|---|
| 4,102,146 | A * | 7/1978 | Dietrich ......................... | 405/169 |
| 4,188,050 | A * | 2/1980 | Lochte ............................ | 285/24 |
| 4,191,256 | A * | 3/1980 | Croy et al. ..................... | 166/343 |
| 4,382,717 | A * | 5/1983 | Morrill .......................... | 405/169 |
| 4,411,317 | A * | 10/1983 | Gieswein ....................... | 166/347 |
| 4,784,525 | A * | 11/1988 | Francois ........................ | 405/191 |
| 6,017,065 | A * | 1/2000 | Hellesøe ......................... | 285/25 |
| 7,402,000 | B2 * | 7/2008 | Bastesen et al. ............... | 405/170 |
| 8,057,126 | B2 * | 11/2011 | Mogedal et al. .............. | 405/170 |
| 8,550,170 | B2 * | 10/2013 | McHugh et al. ............... | 166/351 |

(Continued)

FOREIGN PATENT DOCUMENTS

| | | |
|---|---|---|
| GB | 2440336 A | 1/2008 |
| WO | 2009082240 | 7/2009 |

OTHER PUBLICATIONS

European Search Report and Written Opinion dated Mar. 14, 2013 which was issued in connection with the European Patent Application No. 12007173.3 which was filed on Oct. 17, 2012.

*Primary Examiner* — Matthew Buck
(74) *Attorney, Agent, or Firm* — GE Global Patent Operation (57) ABSTRACT

A connection appliance for connecting an end section of a first conduit to an end section of a second conduit that is fixed to a holding unit of a subsea support structure. The connection appliance comprises a base structure that is connectable to a base frame of the subsea support structure; a sliding unit, to which the end section of the first conduit is to be fixed and which is slidably mounted to the base structure, and an actuating unit configured to act between the base structure and the sliding unit in order to push the sliding unit and the end section of the first conduit axially forwards in relation to the base structure so as to bring the end sections of the conduits into contact with each other.

14 Claims, 5 Drawing Sheets

(56) References Cited

U.S. PATENT DOCUMENTS

| | | | |
|---|---|---|---|
| 2004/0226722 A1* | 11/2004 | Colyer et al. | 166/345 |
| 2007/0269270 A1* | 11/2007 | Bastesen et al. | 405/170 |
| 2008/0014026 A1* | 1/2008 | Routeau et al. | 405/224.2 |
| 2011/0005764 A1* | 1/2011 | Bekkevold | 166/344 |
| 2012/0090152 A1* | 4/2012 | White | 29/464 |
| 2012/0160505 A1* | 6/2012 | Lonnemo et al. | 166/341 |
| 2012/0199358 A1* | 8/2012 | Larsson | 166/341 |

* cited by examiner

CONNECTION APPLIANCE AND CONNECTION ARRANGEMENT COMPRISING SUCH A CONNECTION APPLIANCE

BACKGROUND OF THE INVENTION

Embodiments of the present invention relate to a connection appliance, and more particularly, to a connection appliance for connecting an end section of a first conduit to an end section of a second conduit that is fixed to a holding unit of a subsea support structure. Embodiments of the present invention also relate to a connection arrangement comprising such a connection appliance and a subsea support structure.

Development within offshore oil and gas exploration in the recent years has been directed to subsea installations for processing and transport of oil and gas. These subsea installations replace the traditional platforms, where oil and gas were transported up to the platform for further processing and transport. This development of subsea production, processing and transport systems has resulted in an increasing need for connection arrangements for connecting a first conduit to a second conduit at or near the seabed.

A connection arrangement comprising a connection appliance is previously known from WO 2009/082240 A1. This known connection appliance comprises a base structure, to which a termination head of a first conduit is slidably mounted. At its outer end, the termination head carries a connecting device, for instance in the form of a clamp connector, which is mounted to a hub provided at the outer end of the termination head. An end section of a second conduit is fixed to a holder unit of a subsea support structure. The base structure of the connection appliance is connectable to a base frame of the subsea support structure by being lowered downwards onto the base frame so as to come to bear against it. The base structure of the connection appliance is provided with guiding means configured to co-operate with corresponding guiding means on the base frame of the subsea support structure so as to guide the base structure into a correct position in relation to the base frame when the base structure is lowered downwards into contact with the base frame. When the connection appliance has been landed onto the subsea support structure, a stroking tool in the form of a hydraulic cylinder or a similar mechanism is at one of its ends secured to an anchoring means fixed to the termination head of the first conduit and at its other end secured to an anchoring means fixed to the holding unit of the subsea support structure. Thereafter, the stroking tool is operated to pull the termination head and the clamping device towards and into contact with a hub provided at the end of the second conduit, whereupon the clamping device is operated to clamp the hub of the termination head to the hub of the second conduit so as to thereby form a fluid-tight connection between the first and second conduits.

SUMMARY OF THE INVENTION

Embodiments of the present invention achieve a further development of a connection appliance of the above-mentioned type so as to provide a connection appliance that is improved in at least some aspect.

According to an embodiment of the present invention, there is provided a connection appliance. The connection appliance comprises a base structure configured to be connectable to a base frame of a subsea support structure by being lowered downwards onto the base frame so as to come to bear against it, a sliding unit, to which the end section of a first conduit is to be fixed and which is slidably mounted to the base structure, and an actuating unit configured to act between the base structure and the sliding unit in order to push the sliding unit and the end section of the first conduit axially forwards in relation to the base structure so as to bring the end section of the first conduit into contact with an end section of a second conduit that is fixed to a holding unit of the subsea support structure.

With the connection appliance according to one embodiment of the present invention, the end section of the first conduit is moved towards the end section of the second conduit by being pushed by means of an actuating unit acting between the base structure and the sliding unit of the connection appliance. Hereby, it will be possible to preinstall the actuating unit to the connection appliance at the surface before the connection appliance is lowered into the sea, in contrast to the prior art solution disclosed in WO 2009/082240 A1 where the actuating unit acts between the end section of the first conduit and the holding unit supporting the end section of the second conduit and therefore has to be installed subsea after the landing of the connection appliance onto the base frame of the subsea support structure. Furthermore, by having the actuating unit acting between the base structure and the sliding unit of the connection appliance, no part of the actuating unit needs to extend between the end section of the first conduit and the holding unit supporting the end section of the second conduit. Hereby, the access to the area between the end section of the first conduit and the end section of the second conduit will not be restricted by the actuating unit and this area will consequently be accessible from both sides in the horizontal direction and from above in the vertical direction even when the actuating unit is in place.

Further advantages as well as advantageous features of the connection appliance of embodiments of the present invention will appear from the following description and the dependent claims.

Embodiments of the present invention also relate to a connection arrangement, which comprises a connection appliance according to embodiments of the present invention and a subsea support structure.

BRIEF DESCRIPTION OF THE DRAWINGS

With reference to the appended drawings, a specific description of embodiments of the present invention cited as examples follows below. In the drawings.

DETAILED DESCRIPTION OF THE EXEMPLARY EMBODIMENTS OF THE INVENTION

A connection appliance 10 according to an embodiment of the present invention and an associated subsea support structure 50 are illustrated in FIGS. 1-5. The connection appliance 10 and the subsea support structure 50 are to be used for connecting an end section 1 of a first conduit to an end section 2 of a second conduit. The end section 1 of the first conduit is intended to be fixed to the connection appliance 10 during and after the connection of the two conduits to each other, whereas the end section 2 of the second conduit is intended to be fixed to the subsea support structure 50 during and after the connection of the two conduits to each other.

Said first end second conduits may be rigid or flexible conduits of single bore or multibore type.

The connection appliance 10 comprises a base structure 20 and a sliding unit 30, which is slidably mounted to the base structure 20. The end section 1 of the first conduit is to be fixed to the sliding unit 30. The connection appliance 10 also comprises an actuating unit 40, which is configured to act between the base structure 20 and the sliding unit 30 and by means of which the sliding unit 30 and the end section 1 of the first conduit can be pushed axially forwards in relation to the base structure 20.

In one embodiment, the base structure 20 of the connection appliance 10 comprises a lower base frame 21 and a support sleeve 22 mounted to the base frame 21, whereas the sliding unit 30 comprises a tubular body 31 and a vertical holding plate 32 rigidly mounted to the tubular body 31 at the front end thereof. The tubular body 31 is configured to surround the end section 1 of the first conduit and is displaceably received in the support sleeve 22. The tubular body 31 extends through the support sleeve 22 and is axially displaceable in relation to the support sleeve 22 by means of the actuating unit 40. The tubular body 31 extends through a bearing 23 at the rear end of the support sleeve 22 and through a bearing 24 at the front end of the support sleeve (see FIG. 3A). The end section 1 of the first conduit extends through and is fixed to the tubular body 31. Thus, the end section 1 of the first conduit will be axially displaced together with the tubular body 31 when the tubular body is displaced in relation to the support sleeve 22. In the illustrated example, the end section 1 of the first conduit extends through an opening in a rear end wall 33 of the tubular body 31 and through an opening in the holding plate 32. A radially extending mounting collar 39 is fixed to the end section 1 of the first conduit at the front end thereof. This mounting collar 39 is received in an annular recess provided in the envelop surface of the end section 1 of the first conduit. The mounting collar 39 surrounds the end section 1 of the first conduit and is secured to the holding plate 32, for instance by means of fastening members in the form of screws or bolts, so as to thereby secure the end section 1 of the first conduit to the sliding unit 30.

Figure 1A:
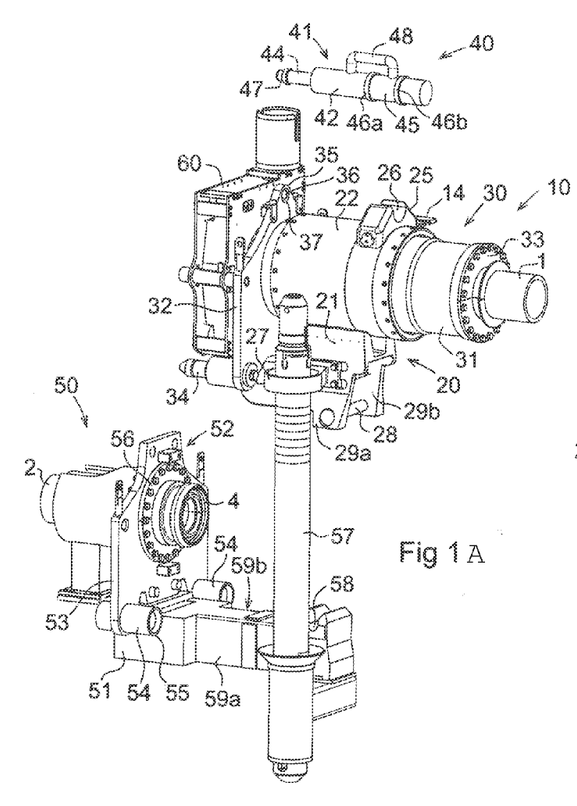
FIGS. 1A and 1B are perspective views from a first direction of a connection appliance according to an embodiment of the present invention and an associated subsea support structure.
Figure 1B:
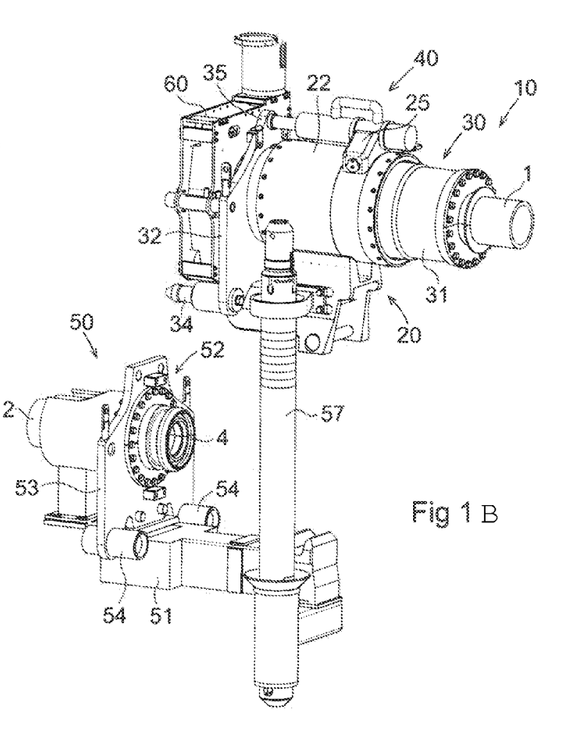

In one embodiment, the actuating unit 40 comprises a stroking device in the form of a hydraulic cylinder 41, which is configured to act between the support sleeve 22 and the tubular body 31. The hydraulic cylinder 41 comprises a cylinder part 42, a piston 43 displaceably received inside the cylinder part and a piston rod 44 fixed to the piston. The cylinder part 42 is more particularly fixed to the base structure 20 and the piston rod 44 is fixed to the sliding unit 30. In this case, the base structure 20 comprises a first holder 25 to which the cylinder part 42 is attached, whereas the sliding unit 30 comprises a second holder 35 to which the piston rod 44 is attached. In the illustrated example, the first holder 25 is mounted to the support sleeve 22, whereas the second holder 35 forms part of the holding plate 32 provided at the front end of the tubular body 31. The cylinder part 42 and the piston rod 44 are releasably attached to the first and second holders 25, 35. FIG. 1A shows the hydraulic cylinder 41 separated from the first and second holders 25, 35, and FIG. 1B shows the hydraulic cylinder 41 mounted to these holders.

In the illustrated example, the cylinder part 42 comprises a cylindrical section 45 located between two radially extending stop members 46a, 46b, which are fixed to the envelop surface of the cylinder part. When the cylinder part 42 is mounted to the first holder 25, the cylindrical section 45 is received in an upwardly facing seat 26 of the first holder 25 with the stop members 46a, 46b in contact with vertically extending surfaces provided on the first holder 25 on either side of the seat 26 so as to thereby keep the cylinder part 42 axially fixed to the first holder 25. When the piston rod 44 is to be mounted to the second holder 35, the outer end of the piston rod 44 is received in a recess 36 provided in the second holder 35. The piston rod 44 may be axially fixed to the second holder 35 by means of a locking pin 37, which is mounted to the second holder 35 and extends into the recess 36. The locking pin 37 is moveable in relation to the second holder 35 between a locking position, in which the locking pin 37 is in engagement with a locking groove 47 provided at the outer end of the piston rod 44 and thereby prevents the outer end of the piston rod from being axially displaced out of the recess 36, and an unlocking position, in which the locking pin 37 is out of engagement with the locking groove 47 and thereby allows the outer end of the piston rod 44 to be axially displaced into or out of the recess 36. The cylinder part 42 may be lifted vertically out of the seat 26 in the first holder 25 when the outer end of the piston rod 44 is disengaged from the recess 36 in the second holder 35. In the illustrated example, a handle 48 is fixed to the cylinder part 42 in order to facilitate the lifting of the hydraulic cylinder 41 into and out of the seat 26.

The connection appliance 10 comprises a locking device 11 for releasably locking the tubular body 31 of the sliding unit to the support sleeve 22 of the base structure. This locking device 11 is provided with a locking member 12 which is moveably mounted to the support sleeve 22 so as to be moveable from a locking position (see FIGS. 3A and 3B), in which the tubular body 31 is prevented by the locking member 12 from moving axially in relation to the support sleeve 22, to an unlocking position (see FIG. 3C), in which the tubular body 31 is allowed to move axially in relation to the support sleeve 22. In one embodiment, the locking member 12 is rotatably mounted to the support sleeve 22 so as to be rotatable about its longitudinal axis between the locking position and unlocking position, the locking member 12 being configured to engage with a locking groove 13a, 13b on the tubular body 31 in the locking position. In the illustrated example, two such locking grooves 13a, 13b are provided on the tubular body 31, these locking grooves 13a, 13b being spaced apart in the axial direction of the tubular body 31 so as to allow the tubular body to be locked to the support sleeve 22 in two different axial positions. In the illustrated example, the locking member 12 is arranged in the first holder unit 25 and connected to a handle 14, by means of which the locking member 12 may be rotated between the locking position and unlocking position.

The subsea support structure 50 comprises a horizontally extending base frame 51 and a holding unit 52 rigidly connected to the base frame 51. The end section 2 of the second conduit is fixed to a holding plate 53 included in the holding unit 52. This holding plate 53 is mounted to the base frame 51 and extends in a vertical direction from the base frame. In the illustrated example, a radially extending mounting collar 56 is fixed to the end section 2 of the second conduit at the outer end thereof. This mounting collar 56 is received in an annular recess provided in the envelop surface of the end section 2 of the second conduit. The mounting collar 56 surrounds the end section 2 of the second conduit and is secured to the holding plate 53, for instance by means of fastening members in the form of screws or bolts, so as to thereby secure the end section 2 of the second conduit to the holding unit 52.

The base structure 20 of the connection appliance 10 is connectable to the base frame 51 of the subsea support structure 50 by being lowered downwards onto the base frame 51 so as to come to bear against it. Thus, the base frame 51 of the subsea support structure constitutes a landing platform for the connection appliance 10. The base structure 20 of the connection appliance 10 is provided with guiding means 27, 28, 29a, 29b configured to co-operate with corresponding guiding means 57, 58, 59a, 59b on the subsea support structure 50 so as to guide the base structure 20 into a correct position in relation to the base frame 51 when the base structure 20 is lowered downwards into contact with the base frame 51.

In one embodiment, the guiding means of the base structure 20 comprise a ring-shaped guide member 27, which is mounted to the base frame 21 of the base structure 20 so as to project in a horizontal direction therefrom. This guide member 27 is configured to engage with a guide member in the form of a vertically extending guide post 57 detachably mounted to the base frame 51 of the subsea support structure 50. The guide member 27 is to pass over the top of the guide post 57 when the connection appliance 10 is lowered towards the subsea support structure 50 and then slide downwards along the guide post until the base structure 20 of the connection appliance makes contact with the base frame 51 of the subsea support structure.

In one embodiment, the guiding means of the base structure 20 further comprise an elongated and horizontally extending guide member in the form of a guide rod 28, which extends perpendicularly to the longitudinal axis of the base structure 20. This guide rod 28 is mounted to the base frame 21 of the base structure 20 on the underside thereof and is configured to come into engagement with a corresponding elongated and horizontally extending guide member in the form of a guide groove 58 on the base frame 51 of the subsea support structure 50 when the base structure 20 of the connection appliance is lowered downwards into contact with the base frame 51. The guide groove 58 is mounted on the upper side of the base frame 51 and has an upwardly directed opening, through which the guide rod 28 may pass into the guide groove 58.

In one embodiment, the guiding means of the base structure 20 also comprise two guide members in the form of vertical guide plates 29a, 29b, which extend in the longitudinal direction of the base structure 20. These guide plates 29a, 29b are mounted to the base frame 21 of the base structure 20 and project from the underside thereof. The guide plates 29a, 29b are configured to come into engagement with vertical guide surfaces 59a, 59b on the base frame 51 of the subsea support structure 50 when the base structure 20 of the connection appliance is lowered downwards into contact with the base frame 51.

The subsea support structure 50 and the sliding unit 30 of the connection appliance 10 are provided with corresponding alignment members 54, 34, which are configured to come into contact with each other in order to align the end section 1 of the first conduit with the end section 2 of the second conduit when the sliding unit 30 and the end section 1 of the first conduit are pushed forwards in relation to the base structure 20 by means of the actuating unit 40. At least one of the subsea support structure 50 and the sliding unit 30 is suitably provided with at least one horizontally extending male-like alignment member 34, more particularly in the form of a spear, which is designed to fit into a corresponding female-like alignment member 54, more particularly in the form of a spear funnel, arranged on the other one of the subsea support structure 50 and sliding unit 30. In one embodiment, the sliding unit 30 is provided with two alignment spears 34 located on either side of a vertical center plane of the sliding unit, whereas the subsea support structure 50 is provided with two spear funnels 54 for receiving a respective one of the alignment spears 34. The spear funnels 54 are mounted to the holding plate 53 and are located on either side of a vertical center plane of the holding unit 52. A shoulder 38 on the respective alignment spear 34 is configured to abut against the outer edge 55 of the corresponding spear funnel 54 when a hub 3 provided at the outer end of the first conduit has been displaced into contact with a corresponding hub 4 provided at the outer end of the second conduit.

The connection arrangement comprises a connecting device 60 for clamping together the hub 3 on the end section 1 of the first conduit and the hub 4 on the end section 2 of the second conduit in order to form a fluid-tight connection between the two conduits. This connecting device 60 is attached to the sliding unit 30 in order to be displaced towards the end section 2 of the second conduit when the sliding unit 30 and the end section 1 of the first conduit are pushed forwards in relation to the base structure 20 by means of the actuating unit 40. In one embodiment, the connecting device 60 is attached to the holding plate 32 of the sliding unit 30 and has the form of a clamp connector. The connecting device may alternatively for example be in the form of a collet connector.

Different steps in a process of connecting an end section 1 of a first conduit to an end section 2 of a second conduit by means of a connection arrangement comprising a connection appliance 10 and a subsea support structure 50 of the types described above are illustrated in FIGS. 1B, 2, 4 and 5A-5C.

Figure 2:
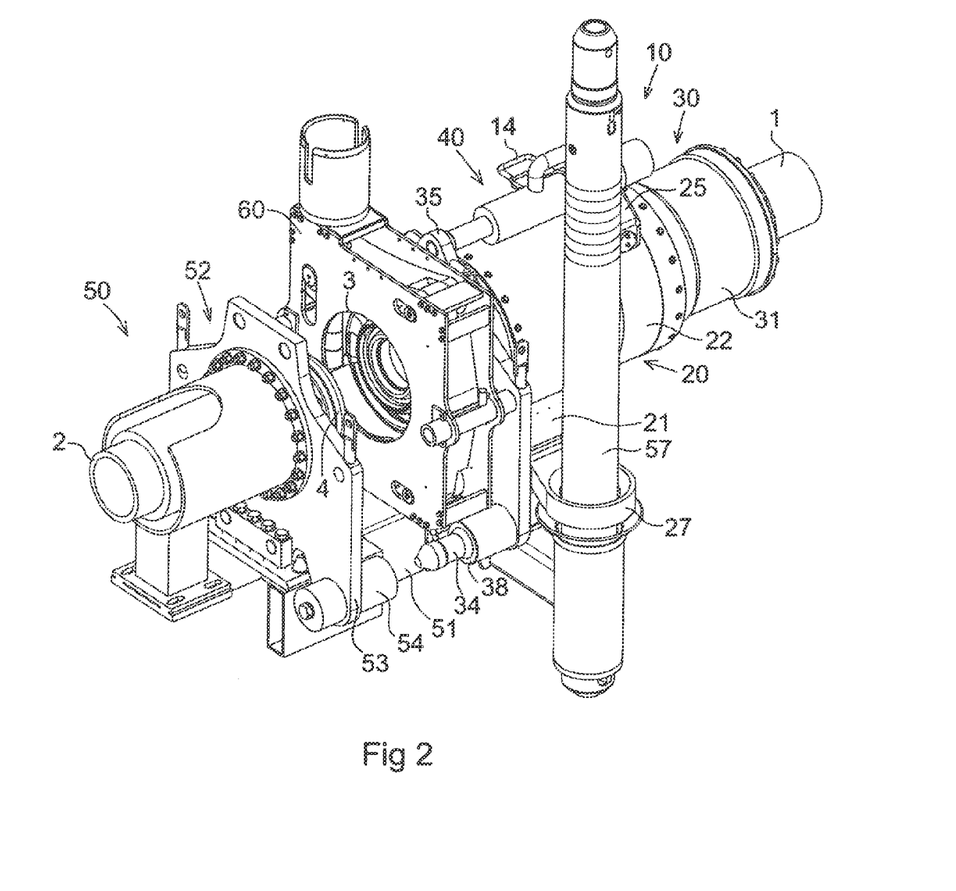
FIG. 2 is a perspective view from another direction of the connection appliance and subsea support structure of FIGS. 1A and 1B, as seen with the connection appliance landed on the subsea support structure.
Figure 3:
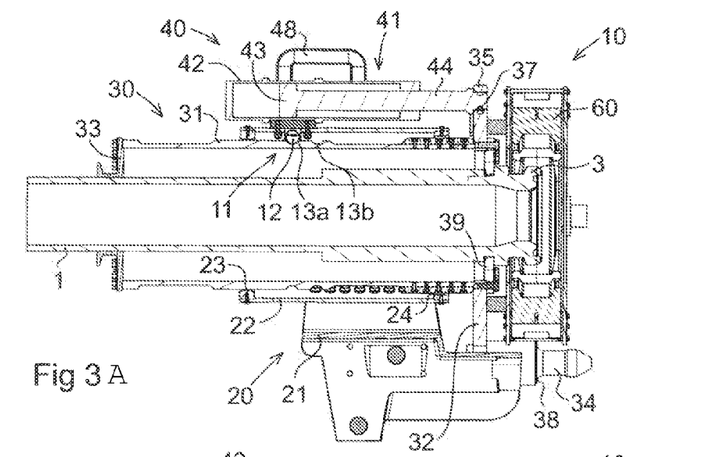
FIGS. 3A, 3B, and 3C are longitudinal sections through the connection appliance of FIGS. 1A and 1B, with the sliding unit of the connection appliance illustrated in different positions in relation to the base structure of the connection appliance.
Figure 4:
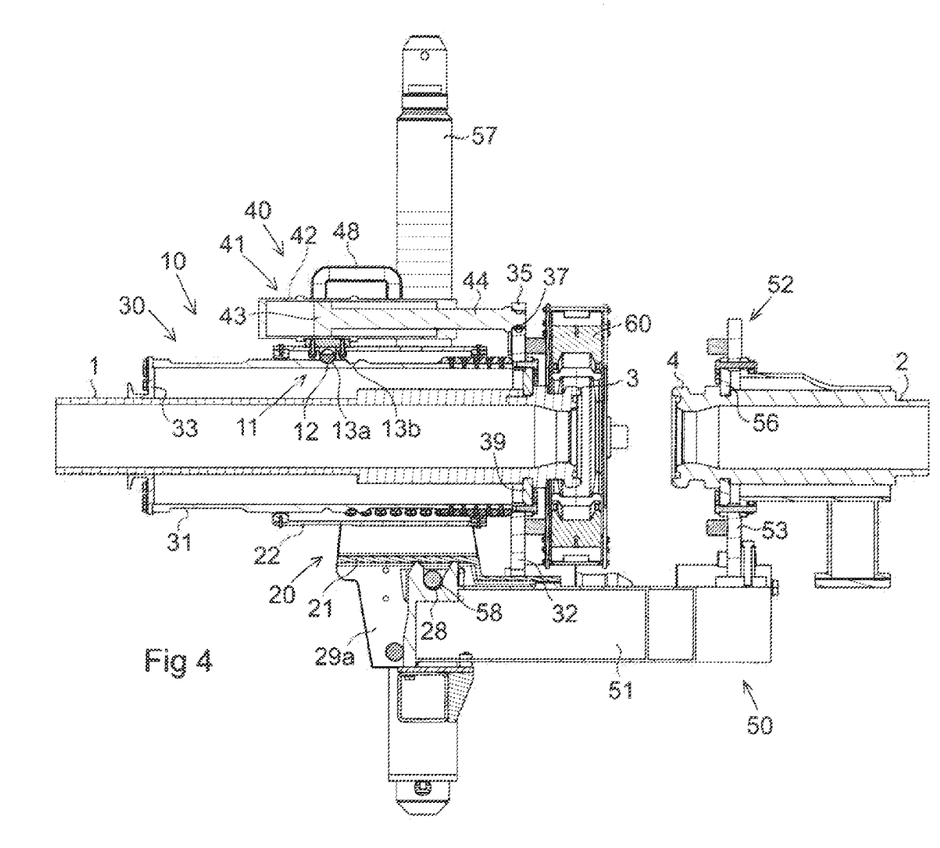
FIG. 4 is a longitudinal section through the connection appliance and subsea support structure of FIG. 2, and FIGS. 5A, 5B, and 5C are perspective views illustrating different steps in a process of connecting the end sections of two conduits to each other by means of the connection appliance and subsea support structure of FIGS. 1A, 1B, 2, 3A, 3B, 3C, and 4.
Figure 5A:
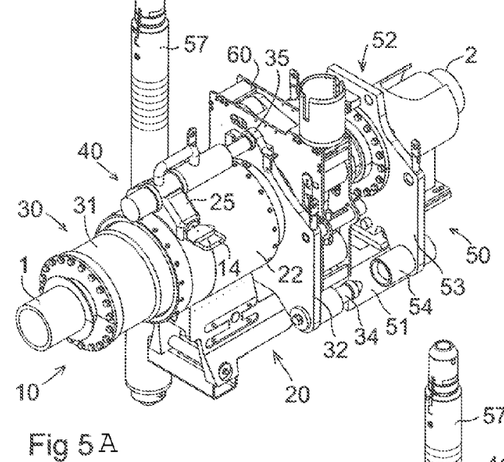
Figure 5B:
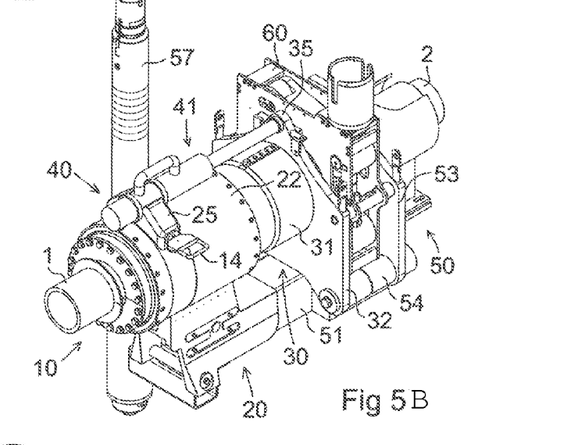
Figure 5C:
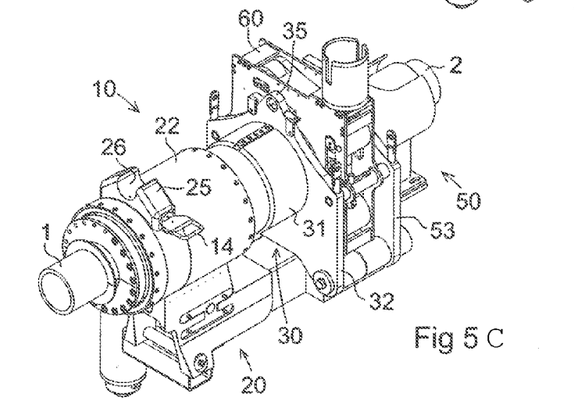

The subsea support structure 50 is mounted to a subsea foundation (not shown) and the end section 2 of the second conduit is fixed to the holding unit 52 of the subsea support structure. The connecting device 60 and the end section 1 of the first conduit are secured to the sliding unit 30 of the connection appliance 10 before the connection appliance is lowered into the sea. The actuating unit 40 may also be secured to the sliding unit 30 and the base structure 20 of the connection appliance 10 before the connection appliance is lowered into the sea. The connection appliance 10 is lowered into the sea, e.g. from a surface vessel, while hanging in a crane hook of a hoisting device through lifting wires (not shown) attached to the connection appliance 10. During the lowering of the connection appliance 10, the locking member 12 is in a locking position and thereby prevents the tubular body 31 of the sliding unit 30 from sliding in relation to the support sleeve 22 of the base structure 20. A guide line (not shown) attached to the upper end of the guide post 57 of the subsea support structure 50 will assist the guiding to ensure that the ring-shaped guide member 27 of the base structure 20 will be properly engaged with the guide post 57, as illustrated in FIG. 1B. The connection appliance 10 is lowered further downwards while being guided along the guide post 57 until the guide members 28, 29a, 29b on the base structure 20 of the connection appliance 10 come into engagement with the corresponding guide members 58, 59a, 59b on the subsea support structure 50 and until the base frame 21 included in the base structure 20 of the connection appliance comes to bear against the base frame 51 of the subsea support structure 50, as illustrated in FIGS. 2, 4 and 5A. Thereafter, an ROV (ROV=Remotely Operated Vehicle) is made to grip the handle 14 of the locking device 11 in order to move the locking member 12 from the locking position to the unlocking position. The actuating unit 40 is then actuated to push the sliding unit 30 forwards in relation to the base structure 20 so as to move the end section 1 of the first conduit and the connecting device 60 from the position illustrated in FIG. 5A to the position illustrated in FIG. 5B. The hub 3 of the first conduit is thereby brought into contact with the hub 4 of the second conduit. A remotely operated torque tool (not shown), which is detachably mounted to the connecting device 60, is then operated to actuate the connecting device 60 so as to clamp together the hub 3 of the first conduit and the hub 4 of the second conduit. Thereafter, the actuating unit 40 is released from the first and second holders 25, 35 and detached from the connection appliance 10, as illustrated in FIG. 5C. The actuating unit 40 may then be retrieved to the surface vessel together with the torque tool and the guide post 57.

The invention is of course not in any way restricted to the embodiments described above. On the contrary, many possibilities to modifications thereof will be apparent to a person with ordinary skill in the art without departing from the basic idea of the invention such as defined in the appended claims.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural element with insubstantial differences from the literal languages of the claims.

What is claimed is:

1. A connection appliance for connecting an end section of a first conduit to an end section of a second conduit that is fixed to a holding unit of a subsea support structure, the connection appliance comprising:
   a base structure configured to be connectable to a base frame of the subsea support structure by being lowered downwards onto the base frame to bear against the base frame, wherein the base structure comprises a first holder attached to an exterior of the base structure;
   a sliding unit slidably mounted to the base structure, wherein the end section of the first conduit is fixed to the sliding unit, wherein the sliding unit comprises a second holder; and
   an actuating unit configured to act between the base structure and the sliding unit to push the sliding unit and the end section of the first conduit axially forwards in relation to the base structure to bring the end section of the first conduit into contact with the end section of the second conduit, wherein the actuating unit comprises a stroking device in the form of a hydraulic cylinder;
   wherein a cylinder part of the hydraulic cylinder is attached or attachable to the first holder; and
   wherein a piston rod of the hydraulic cylinder is attached or attachable to the second holder.

2. The connection appliance according to claim 1, further comprising:
   a locking device configured to releasably lock a tubular body of the sliding unit to a support sleeve of the base structure, the locking device comprising a locking member moveable from a locking position, in which the tubular body is prevented by the locking member from moving axially in relation to the support sleeve, to an unlocking position, in which the tubular body is allowed to move axially in relation to the support sleeve.

3. The connection appliance according to claim 1, wherein the cylinder part and the piston rod are releasably attachable to the first holder and the second holder.

4. The connection appliance according to claim 1, wherein:
   the base structure comprises a support sleeve, and
   the sliding unit comprises a tubular body configured to surround the end section of the first conduit, wherein the tubular body is displaceably received in the support sleeve, and is axially displaceable in relation to the support sleeve by the actuating unit.

5. A connection arrangement for subsea connection of an end section of a first conduit to an end section of a second conduit, the connection arrangement comprising:
   a subsea support structure comprising a base frame and a holding unit fixed to the base frame; and
   a connection appliance comprising:
      a base structure configured to be connectable to the base frame of the subsea support structure by being lowered downwards onto the base frame to bear against the base frame, wherein the base structure of the connection appliance comprises at least one guide configured to co-operate with at least one corresponding guide on the base frame of the subsea support structure to guide the base structure into a correct position in relation to the base frame when the base structure is lowered downwards into contact with the base frame, and wherein the base structure further comprises a first holder attached to an exterior of the base structure;
      a sliding unit slidably mounted to the base structure, wherein the end section of the first conduit is fixed to the sliding unit, wherein the sliding unit comprises a second holder; and
      an actuating unit configured to act between the base structure and the sliding unit to push the sliding unit and the end section of the first conduit axially forwards in relation to the base structure to bring the end section of the first conduit into contact with the end section of the second conduit, wherein the actuating unit comprises stroking device in the form of a hydraulic cylinder;
      wherein a cylinder part of the hydraulic cylinder is attached or attachable to the first holder; and
      wherein a piston rod of the hydraulic cylinder is attached or attachable to the second holder;
   wherein the end section of the second conduit is fixed to the holding unit of the subsea support structure.

6. The connection arrangement according to claim 5, wherein the at least one guide of the base structure comprises an elongated and horizontally extending guide member extending perpendicularly to a longitudinal axis of the base structure, wherein the guide member of the base structure is configured to engage with a corresponding elongated and horizontally extending guide member of the at least one corresponding guide on the base frame of the subsea support structure when the base structure is lowered downwards into contact with the base frame.

7. The connection arrangement according to claim 5, wherein the at least one guide of the base structure comprises a guide member configured to engage with a vertically extending guide post mounted to the base frame of the subsea support structure.

8. The connection arrangement according to claim 5, wherein the subsea support structure and the sliding unit of the connection appliance comprise corresponding alignment members configured to come into contact with each other in order to align the end section of the first conduit with the end section of the second conduit when the sliding unit and the end section of the first conduit are pushed forwards in relation to the base structure by the actuating unit.

9. The connection arrangement according to claim 8, wherein one of the subsea support structure and the sliding unit comprises at least one horizontally extending male-like alignment member configured to fit into a corresponding female-like alignment member arranged on the other one of the subsea support structure and the sliding unit.

10. The connection arrangement according to claim 9, wherein the male-like alignment member is in the form of a spear, and the female-like alignment member is in the form of a spear funnel.

11. The connection arrangement according to claim 8, wherein the sliding unit comprises at least two alignment members located on either side of a vertical center plane of the sliding unit.

12. The connection arrangement according to claim 5, further comprising:
   a connecting device configured to clamp together the end section of the first conduit and the end section of the second conduit, the connecting device configured to be attached to the sliding unit in order to be displaced towards the end section of the second conduit when the sliding unit and the end section of the first conduit are pushed forwards in relation to the base structure by the actuating unit.

13. The connection arrangement according to claim 12, wherein the connecting device is a clamp connector.

14. The connection arrangement according to claim 5, wherein:
   the base structure comprises a support sleeve, and
   the sliding unit comprises a tubular body configured to surround the end section of the first conduit, wherein the tubular body is displaceably received in the support sleeve, and is axially displaceable in relation to the support sleeve by the actuating unit.

* * * * *